United States Patent
Blum et al.

(10) Patent No.: US 6,313,250 B1
(45) Date of Patent: Nov. 6, 2001

(54) POLYFUNCTIONALLY REACTIVE POLYMER SUBSTANCES

(75) Inventors: Rainer Blum, Ludwigshafen; Lukas Haeussling, Bad Duerkheim; Wolfgang Reich, Maxdorf, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/101,185

(22) PCT Filed: Dec. 30, 1996

(86) PCT No.: PCT/EP96/05863

§ 371 Date: Apr. 6, 1999

§ 102(e) Date: Apr. 6, 1999

(87) PCT Pub. No.: WO97/25365

PCT Pub. Date: Jul. 17, 1997

(30) Foreign Application Priority Data

Jan. 4, 1996 (DE) ................................. 196 00 155

(51) Int. Cl.$^7$ .................................... C08F 10/00
(52) U.S. Cl. ............................ 526/284; 526/282; 526/75; 526/204; 526/272; 560/220
(58) Field of Search .................................. 526/282, 284, 526/75, 204, 272; 560/220

(56) References Cited

U.S. PATENT DOCUMENTS 4,097,677 * 6/1978 Emmons et al. ..................... 560/220
4,224,430 * 9/1980 Maekawa et al. ................... 526/282
4,721,757 * 1/1988 Schlinder ............................ 525/245

FOREIGN PATENT DOCUMENTS 0485 990A2 * 5/1992 (EP) .
3-237048 * 10/1991 (JP) .
4-149050 * 5/1992 (JP) .

* cited by examiner

*Primary Examiner*—David W. Wu
*Assistant Examiner*—Tanya Zalukaeva
(74) *Attorney, Agent, or Firm*—Oblon, Spivak, McClelland, Maier & Neustadt, P.C.

(57) ABSTRACT

The invention relates to polyfunctionally reactive polymeric substances which contain at least two structural units of the general formulae (I) and/or (II)

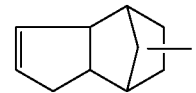

(I)

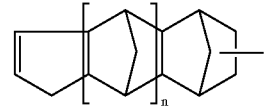

(II)

$n = 1$ to $10$ in the molecule and whose polymer backbone linkages are C—C bonds, ether bonds, urethane bonds, amide bonds, ketone bonds or combinations thereof. The substances are useful as binders for various applications.

7 Claims, No Drawings

POLYFUNCTIONALLY REACTIVE POLYMER SUBSTANCES

The present invention relates to polyfunctionally reactive polymeric substances containing structural units of dihydrodicyclopentadiene and/or its oligomers.

Numerous patents relate to unsaturated polyester resins containing structural units derived from dicyclopentadiene (=DCPD) or dihydrodicyclopentadiene (=DHCPD), which are generally used dissolved in monomeric reactive diluents such as styrene, α-methyl-styrene, vinyltoluene, allyl phthalate, acrylates, vinylates, vinyl ethers or the like.

Known monomeric compounds are for example maleic acid dihydrodicyclopentadienol monoester (CAS 56 102-16-0, 27 063-31-6, 28 347-17-3, 25 102-16-0, 27 063-31-6, 28 347-17-3, 29 725-36-8, 53 702-55-9, 56 102-16-0, 74 033-90-2, 100 429-54-7), maleic acid dihydrodicyclopentadienol diester (CAS 116 296-55-0, 151 379-31-6, 114 422-30-9), ester of maleic acid dihydrodicyclopentadienol monoester with n-butanol (CAS 117 205-58-0, 116 057-35-3), ethylhexanol (CAS 17 205-57-9, 116 057-34-2), isopropylene glycol (diester) (CAS 78 099-70-4), ethylene glycol (mono- and diester) (CAS 78 099-70-4, 78 820-56-1), trimethylolpropane (monoester) (CAS 98 312-78-8), propylene glycol (monoester) (CAS 98 520-75-3), 1,3-butanediol (monoester) (CAS 98 392-84-8), diethylene glycol (mono- and diester) (CAS 73 794-24-8), neopentylglycol (monoester) (CAS 121 830-76-0).

It is an object of the present invention to provide novel polyfunctionally reactive polymeric substances which have significant advantages over the prior art in respect of preparation, processing and application spectrum.

We have found that, surprisingly, this object is achieved by polyfunctionally reactive polymeric substances containing dihydrodicyclopentadiene or its oligomers bonded to certain polymer backbones via certain bridging members.

The present invention accordingly provides polyfunctionally reactive polymeric substances which contain at least two structural units of the general formulae (I) and/or (II)

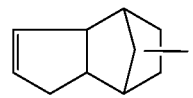

(I)

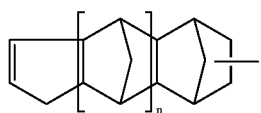

(II)

$n = 1$ to $10$ in the molecule and whose polymer backbone linkages are C—C bonds, ether bonds, urethane bonds, amide bonds, ketone bonds or combinations thereof.

In these novel polyfunctionally reactive polymeric substances, the structural units of the of the general formulae (I) and/or (II) are bonded to the polymer backbone via bridging members —X— conforming to the formulae (III) and/or (IV)

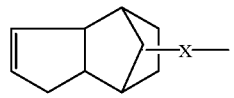

(III)

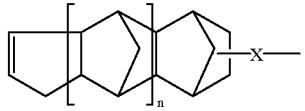

(IV)

$n = 1$ to $10$ where —X— is oxygen,

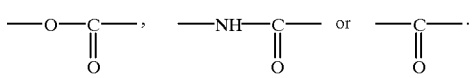

In the polymeric substances of this invention, the structural units of the general formulae (I) and/or (II) can be incorporated as reaction products of compounds of the formulae (V) and/or (VI)

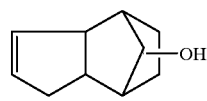

(V)

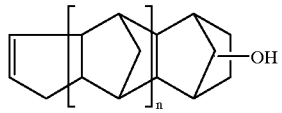

(VI)

$n = 1$ to $10$ with polymeric substances which carry groups which are reactive toward hydroxyl groups, such polymeric substances being obtainable for example as reaction products of compounds of the formula (V) and/or (VI) with polymers having carboxyl groups, isocyanate groups, epoxide groups or hydroxyl groups.

In a particularly preferred embodiment of the polymeric substances of this invention, the structural units of the general formulae (I) and/or (II) are incorporated as reaction products of compounds of the formulae (VII) and/or (VIII)

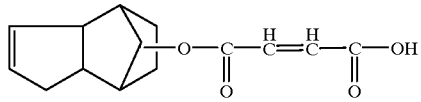

(VII)

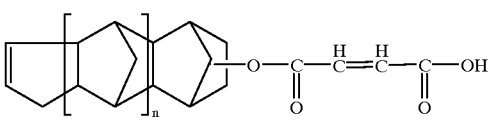

(VIII)

$n = 1$ to $10$ with polymeric substances which carry groups which are reactive toward carboxyl groups, such polymeric substances being obtainable for example as reaction products of compounds of the formulae (VII) and/or (VIII) with polymers having isocyanate, epoxide, hydroxyl and/or amino groups as groups which are reactive toward carboxyl groups.

The polyfunctionally reactive polymeric substances of this invention generally have average molecular weights $M_n$ within the range from 200 to 1000000, preferably within the range from 500 to 50000.

The polymeric substances of this invention carry structural units of the general formulae (1) and (II) derived from dihydrodicyclopentadiene (DCPD). They may be linear or else singly or multiply branched and they have schematically the structures which are represented in the formulae (IX) and (X), but which can also have branching forms other than those shown in the below-shown examples, where —X— is a bridging group, and D— is a structure of the formulae (I) and/or (II).

grafting with cyclopentadiene produces endomethylenetetrahydrophthalic acid structures of the following formula:

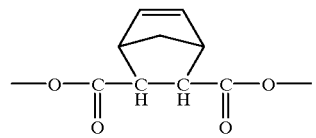

All the routes mentioned to the substances of this invention are exemplary methods of preparation, which are usu-

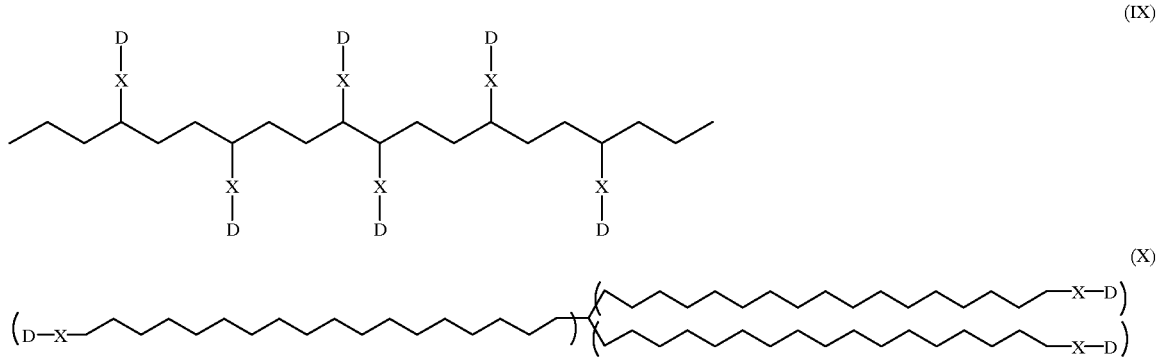

(IX)

(X)

Substances are readily available in which —X— is an ester group and which are obtained by addition of DCPD onto polyfunctional polycarboxylic acids. This reaction can be carried out with advantage in the presence of catalysts, for example boron trifluoride etherate.

Very ready availability is an attribute of the formula (VII) or (VIII) adducts of maleic anhydride and water with DCPD, whereby the substances of this invention are obtainable by reaction with carboxyl-reactive substances. Such carboxyl-reactive substances include for example mono- and polyfunctional polymeric hydroxyl compounds, carboxylic esters of mono- and polyfunctional, monomeric or polymeric hydroxyl compounds, mono- and polyfunctional, monomeric or polymeric epoxides, hydroxy-functional natural oils and resins, epoxidized natural oils and resins, mono- and polyfunctional, monomeric or polymeric isocyanates and also mono- and polyfunctional monomeric or polymeric amines.

Similarly, dihydrodicyclopentadienol of the formula (V) is commercially available and can be obtained for constructing the substances of this invention, by reaction with substances which are reactive with OH groups.

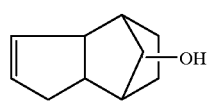

(V)

Such hydroxyl-reactive substances include for example polyfunctional monomeric or polymeric carboxyl compounds, polyfunctional monomeric or polymeric epoxides, carboxyl-functional natural oils and resins, epoxidized natural oils and resins, polyfunctional monomeric or polymeric isocyanates, polyfunctional monomeric or polymeric hydroxyl compounds, polyfunctional, monomeric or polymeric carboxylic esters.

When the substances of this invention contain ethylenic double bonds, for example as maleic or fumaric esters, ally also advantageous. However, the invention is directed not just to substances obtained by the outlined methods.

An important class of claimed substances for the present invention are the esters of substances of the formulae (VII) and (VIII) with branched alkane-, alkene- and alkyne-diols, ethoxylated or propoxylated trimethylolpropane, pentaerythritol, ethoxylated or propoxylated pentaerythritol, glycerol, ethoxylated or propoxylated glycerol, neopentylglycol, ethoxylated or propoxylated neopentylglycol, 2-ethyl-2-butyl-1,3-propanediol, ethoxylated or propoxylated 2-ethyl-2-butyl-1,3-propanediol, with sorbitol, inositol, anhydrosorbitol and the alkoxylation products of these substances, the esters of inner ethers of polyols such as, for example, ditrimethylolpropane, dipentaerythritol, the esters of ethoxylated or propoxylated inner ethers of polyols such as, for example, ditrimethylolpropane or dipentaerythritol, dimethylolpropionic acid, polyethylene glycol monoalkyl ether, polypropylene glycol monoalkyl ethers, polyethylene glycol monoalkyl esters, polypropylene glycol monoalkyl esters, polyester- and polyether-polyols of the type polyethylene oxide, polypropylene oxide, polytetrahydrofuran and polycaprolactone.

The nature of the alkoxylating agent and the degree of alkoxylation also make possible to control properties of the end products such as, for example, hardness, hydrophilicity and elasticity. Such polyfunctional hydroxyl compounds may also be only partially esterified with substances of the formulae (VII) and (VIII), in which case the remaining hydroxyl groups can either remain free or be esterified or etherified with other substances or reacted with other, reactive substances, for example isocyanates or epoxides. Suitable for this purpose are polyols which are only partially esterified with substances according to the formulae (VII) and (VIII), while the other hydroxyl groups can be reacted with substances which carry ethylenic double bonds. Such substances then carry on the same molecule not only the esters of the substances of the formulae (VII) and (VIII) but also, for example, allyl and/or vinyl ethers and/or (meth) acrylic esters. Further suitable reaction components are hydroxyl-containing natural resins or oils, for example castor oil.

It is also possible to prepare substances according to this invention which possess enhanced photosensitivity as a result of carrying in the molecule H-acceptor groups, which can be incorporated for example via hydroxy-functional phenone compounds, for example hydroxy- or bishydroxy-benzophenone, by partial reaction with polymers which are reactive with hydroxy compounds, such as polyfunctional isocyanates. In this example, the groups of the formulae (I) and (II) can then be introduced via dicyclopentadiene compounds which are reactive with isocyanate.

A preferred and simple method for preparing substances of this invention includes the amidation or esterification of substances according to the formulae (VII) and (VIII) with polyfunctional amines or polyfunctional hydroxyl compounds (polyols) at elevated temperature in the presence or absence of catalysts, such as tertiary amines, tin compounds or hypophosphoric acid. Groups of the formula (II) or of the formula (VIII) can also be introduced by first amidating or esterifying with the carboxylic acid of the formula (VII) while adding dicyclopentadiene at the same time or thereafter, structures of the formula (II) or of the formula (VIII) being formed as a result. The amidation or esterification can also be carried out in the presence of suitable entraining solvents for removing water. Other well known methods of preparative chemistry for synthesizing amides or esters are suitable in principle, but usually of less interest on grounds of cost.

Another important class of substances are the products of the reaction of substances of the formula (VII) or of the formula (VIII) with polyfunctional epoxide compounds, in which an addition to the epoxide group takes place in a first stage and the hydroxyl groups formed in the first stage can likewise be esterified under more energetic conditions, so that highly reactive, polyfunctional substances are formed.

To introduce the structures of the formulae (I) and (II) into substances capable of reacting polyfunctionally with hydroxyl groups it is possible in principle to use the substances according to the formulae (III) and (IV). Dihydrodicyclopentadienol is commercially available, but relatively costly. Less costly are the monoesters of diols with substances of the formula (VII) or of the formula (VIII), which can then react with polyisocyanates, for example.

The polymeric substances of this invention can react with themselves, ie. oligomerize, polymerize or crosslink, not only under high energy radiation, preferably UV light, but also free-radically at room temperature using known combinations of peroxides and co-initiators such as, for example, heavy metal salts and also thermally using thermal free-radical initiators, such as peroxides, azo initiators or compounds having labile C—C bonds. The aforementioned reaction-initiating methods can also be used in combination. Preference is given to the combined use of thermally generated free radicals and UV-generated free radicals. Similarly, reaction to a B-stage, ie. a partially reacted stage, where the reaction is interrupted and can later be restarted, is possible. An appreciable acceleration of the curing reaction, or a reduction in the curing temperature, is possible using metal coinitiators such as, for example, cobalt, manganese, iron, nickel or lead compounds. Furthermore, the substances of this invention have high UV sensitivity in the presence of UV initiators of the α-cleaving type (Norrish type 1) or of the H-donor/acceptor system type (Norrish type 2).

The substances of this invention can be used in combination with unsaturated polyesters, in which case they can wholly or partly replace the reactive diluents customary with unsaturated polyesters, such as styrene, vinyltoluene, α-methylstyrene, acrylic esters, methacrylic esters, allyl esters, vinyl esters or vinyl ethers and so on.

In addition, the substances of this invention can be used in unsaturated systems in combination with polymerizable acrylates, methacrylates, allyl ethers, allyl esters, polyester acrylates, polyether acrylates, urethane acrylates, epoxyacrylates, vinyl esters or vinyl ethers.

Moreover, the substances of this invention can be added to known thermally curing systems, for example baking finishes based on a wide variety of crosslinking principles, for example baking finishes based on amino resin combinations with alkyd, polyacrylate, polyesters, epoxy or polyurethane resins. In such and other known, customarily solvent-containing coatings, liquid substances of this invention can wholly or partly replace the solvents.

The novel reactive substances can be used alone or in the afore-mentioned or else in other combinations as paint binders, for coating compositions, for preparing compact or cellular, reinforced or unreinforced moldings, encapsulation compositions, electrical insulants, daylight-curable road marking compositions, sealants, coatings, printing ink binders, adhesives or as binders for ordered or random-laid fiber webs composed of organic or inorganic materials.

The parts and percentages mentioned in the examples are by weight, unless otherwise stated.

EXAMPLE 1

661.10 g of dicyclopentadiene (5.0 mol) and 490.30 g of maleic anhydride (5.0 mol) were weighed into a stirred flask equipped with heating and reflux condenser which can be switched to distillation. The mixture was heated to 125° C. under a gentle stream of nitrogen, and then 95.00 g of water (5.0 mol)+5 g) were added via a dropping funnel in the course of one hour. The mixture was reacted for one hour at 1255 to form a monocarboxylic acid of the formula (VII). The contents of the flask were cooled down to 70° C. They were then mixed with 1730.00 g of ethoxylation product of trimethylolpropane and ethylene oxide, having an OH number of 165, and 4.00 g of dibutyltin dilaurate.

The mixture was rapidly heated to 120° C. under a gentle stream of nitrogen and then raised gradually to 190° C. in the course of 6 hours, and the water of condensation formed was removed by distillation.

A viscous resin was obtained having an acid number of 18 and viscosities of 12300 mPas at 50° C., 9350 mPas at 75° C. and 1470 mPas at 100° C.

EXAMPLE 2

Example 1 was repeated to prepare a monocarboxylic acid of the formula (VII). However, the esterification was carried out with 1300.00 g of polyether polyol based on propylene oxide and having an OH equivalent weight of 253.

The result was a viscous resin having an acid number of 24 and viscosities of 2880 mPas at 50° C. and 570 mPas at 75° C.

EXAMPLE 3

Example 1 was repreated to prepare a monocarboxylic acid of the formula (VII). However, the esterification was carried out with 5820.00 g of polyether polyol based on glycerol, propylene oxide and ethylene oxide and having an OH number of 48.

The result was a low-viscosity liquid having an acid number of 31 and viscosities of 1380 mPas at 25° C. and 249 mPas at 50° C.

EXAMPLE 4

In a stirred flask with nitrogen flushing, 497.2 g of the monocarboxylic acid of the above examples (formula VII), 376.0 g of epoxy resin based on bisphenol A (commercial Araldit® GY 2600, Ciba), 0.8 g of triphenylphosphine and 0.8 g of hydroquinone were mixed at room temperature and then heated up. The reaction went exothermic at 110° C., the temperature increase was limited to 144° C. by cooling, and the mixture was stirred at 1305C for a further 3 hours. The resulting resin melt was poured onto an aluminum foil and solidifies on cooling to form a hard resin having a softening point of 142° C.

Curability testing of the products prepared according to Examples 1 to 4

The products obtained according to Examples 1 to 3 were heated to 60° C. and mixed in a ratio of 70:30 with product obtained according to Example 4. These mixtures are free flowing at room temperature and have the following viscosities at 505C:

| 70 parts | 30 parts | Viscosity: |
|---|---|---|
| Product of Example 1 + | product of Example 4 | 17800 mPas |
| Product of Example 2 + | product of Example 4 | 4200 mPas |
| Product of Example 3 + | product of Example 4 | 2350 mPas |

Samples of these mixtures were catalyzed with 4% of t-butyl perbenzoate and 3% of benzophenone, based on the total amount. Sufficient was in each case poured into a deep metal lid to fill it to a depth of about 2 cm. The metal lids were then irradiated on a hotplate at 505C for 60 seconds under a mercury medium pressure lamp using energy of 80 mW/cm². A slightly tacky skin formed to a depth of about 0.3 mm while the main mass underneath was still liquid. The metal lids were then kept for 4 hours in an oven at 140° C. After cooling, fully cured, compact resin blocks were obtained.

Samples of the catalyzed, ready-to-use mixtures were stored at 40° C. for 48 hours. Thereafter neither their viscosity nor their curing behavior had changed.

Further samples of the mixtures were mixed with 4% of methyl isobutyl ketone peroxide, 2% of cobalt octoate (1% strength in toluene) and 3% of benzophenonone. Sufficient of each of these mixtures was poured into a deep metal lid to fill it to a depth of about 2 cm. The metal lids were then irradiated at room temperature with 80 mW/cm² using a mercury medium pressure lamp for 60 seconds. A tacky skin formed to a depth of about 0.3 mm, while the main mass underneath was still liquid. The metal lids were then kept at room temperature (about 25° C.). Fully cured, compact resin blocks were obtained after 20 hours. The experiments without heating showed possibilities of cold curing the substances of this invention.

The uncatalyzed mixtures were drawn down on cleaned steel panels to form films about 30–60 μm in thickness and baked in an oven at 160° C. for 30 minutes. Hard, elastic, firmly adherent films were obtained.

We claim:

1. A heat- or radiation-curable composition, comprising:
   a) a polymeric compound which contains at least two structural units of one of the general formulae (I) and/or (II)

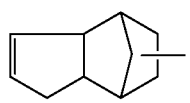

(I)

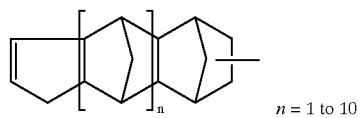

(II)

in the molecule having ether bond linkages in the polymer backbone, and
   b) optionally further comprising conventional components of heat- or radiation-curable compositions, with the proviso that monomeric polymerizable compounds are excluded.

2. A curable composition as claimed in claim 1, further comprising a polymer suitable as paint binder.

3. A curable composition as claimed in claim 1, further comprising a polymerization catalyst or a crosslinking catalyst.

4. A curable composition as claimed in claim 2, wherein the polymer suitable as paint binder is a heat-curable polymer suitable for baking finishes.

5. A curable composition as claimed in claim 3, wherein the polymerization catalyst or the crosslinking catalyst is a free-radical forming catalyst.

6. A curable composition as claimed in claim 1, wherein structural units of the general formulae (I) and/or (II) are bonded to the polymer backbone via bridging members —X— conforming to the formulae (III) and/or (IV):

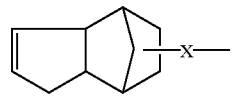

(III)

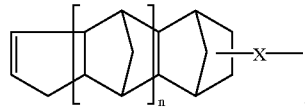

(IV)

where —X— is oxygen,

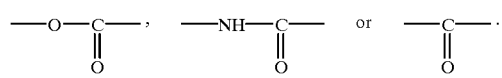

7. A curable composition as claimed in claim 1, wherein the structural units of the general formulae (I) and/or (II) are incorporated in the polymeric substances as reaction products of compounds of the formulae (V) and/or (VI)

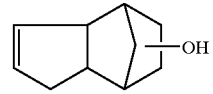

(V)

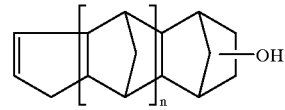

(VI)

with polymeric substances which carry groups are reactive toward hydroxyl groups.

* * * * *

UNITED STATES PATENT AND TRADEMARK OFFICE
CERTIFICATE OF CORRECTION

PATENT NO.     : 6,313,250 B1
DATED          : November 6, 2001
INVENTOR(S)    : Blum et al.

It is certified that error appears in the above-identified patent and that said Letters Patent is hereby corrected as shown below:

<u>Title page,</u>
Item [73], Assignee, should read:

-- [73]   Assignee:      BASF Coatings AG, Muenster (DE) --

Signed and Sealed this

First Day of July, 2003

JAMES E. ROGAN
*Director of the United States Patent and Trademark Office*